Patented June 17, 1952

2,600,835

UNITED STATES PATENT OFFICE 2,600,835

2:6-DIHALOGENODIPHENYLETHERS AND PROCESS OF PREPARING SAME

Edward Teggin Borrows, Kenton, and John Charles Clayton, Southall, England, assignors to Glaxo Laboratories Limited, Greenford, England, a British company No Drawing. Application October 14, 1948, Serial No. 54,583. In Great Britain October 23, 1947

7 Claims. (Cl. 260—309.5)

This invention relates to improvements in or relating to the preparation of dihalogeno-diphenyl ethers of the general formula

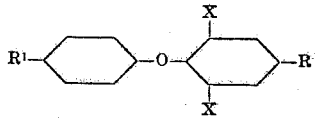

where R, $R^1$ have the meanings stated below, and X may be chlorine, bromine or iodine.

It has been stated in the literature (Harington, Biochem., J., 1927, 21, 169) that a diphenyl ether with two amino groups in the 2:6-positions cannot be converted into an iodo compound by the usual process of tetrazotization and treatment with iodide.

We have now found that by the use of anhydrous conditions this conversion can in fact be satisfactorily effected and that dihalogeno-diphenyl ethers of the type specified above may be readily prepared by treating a diamine of the general formula

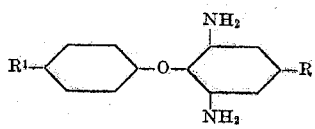

(where R is any substituent such as will not interfere with the reaction and preferably a group readily convertible to an alanine side chain and $R^1$ may be any substituent which will not interfere with the reaction) in solution in glacial acetic acid with a suitable nitrite and concentrated sulphuric acid; the resultant tetrazo compound is then treated with an aqueous solution of a suitable halide.

The term "a suitable nitrite" as used herein means an inorganic nitrite preferably sodium nitrite or an organic nitrite derived from an aliphatic alcohol having less than six carbon atoms for example, amyl nitrite.

The term "a suitable halide" as used herein means an alkali metal iodide or cuprous chloride, bromide or iodide.

It should be noted that the products obtained where $R^1$ is a hydroxyl group, R is a group readily convertible into an alanine side chain and X is iodine are believed to be useful in the synthesis of thyroxine.

According to the invention therefore we provide a process for the preparation of 2:6-dihalogenodiphenyl ethers of the type specified in which a compound of the general formula

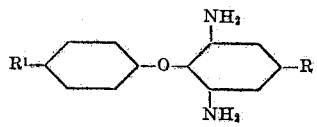

(where R and $R^1$ have the meanings stated herein), is treated in solution in glacial acetic acid with concentrated sulphuric acid and a suitable nitrite as herein defined and the resulting tetrazo compound is subsequently decomposed with a suitable halide as herein defined in the presence of water.

We have found further that in order that the 2:6-dihalogeno-diphenyl ethers of the above general formula may be useful in the synthesis of thyroxine it is preferable that the group R should be one of the following groups:

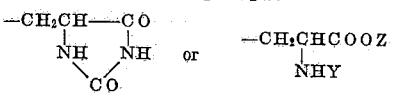

where Z is an alkyl group containing not more than four carbon atoms and Y is a group normally used to protect an amino group such as an acetyl or a benzoyl group. These groups are all convertible by the usual methods to an alanine side-chain.

According to a further feature of the invention therefore the group R is one of the following groups:

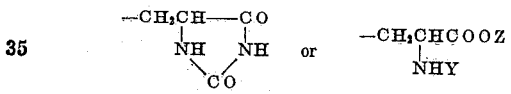

where Y and Z have the above-stated meanings.

We have also found that for similar reasons it is preferable that $R^1$ should be a hydroxyl group, a hydroxyl group protected by a group readily removable therefrom such as an ethyl, methyl or acetyl group.

According to a still further feature of the invention therefore the group $R^1$ is a hydroxyl group or a hydroxyl group protected by a group readily removable therefrom.

It must be emphasized that it is essential to avoid the presence of water during the initial treatment of the diamino compound with the metallic or organic nitrite and concentrated sulphuric acid. It will be obvious that it is desirable to cool the reaction mixture during this stage.

We prefer to prepare the diamino compounds used in the process according to the invention by the reduction of 2:6-dinitro-diphenyl ethers by the usual methods, such for example as by catalytic hydrogenation or by treatment with tin and hydrochloric acid. The 2:6-dinitrodiphenyl ethers may be prepared as described in application Serial No. 54,585, filed of even date herewith, now abandoned.

At present we prefer to prepare compounds in which $R^1$ is a hydroxyl, methoxy or acetyloxy group and X is iodine, and the invention accordingly specifically includes the preparation of such compounds.

We have found further that where the group R is

which group has an asymmetric carbon atom, the use of optically active isomers in the process according to the invention leads to the formation of optically active products. Thus for example if R is an alanine side chain, the use of the L-diamino ether will lead to the formation of the L-dihalogeno ether. The production of optically active compounds in this way is of use in the synthesis of L-thyroxine, which has greater physiological activity than racemic thyroxine. The invention accordingly specifically includes the use of optically active starting materials.

In order that the invention may be well understood the following examples are given only as illustrations:

EXAMPLE 1

Preparation of 3:5-diiodo-4-(4'-methoxyphenoxy)-benzyl hydantoin

3:5-dinitro - 4 - (4'-methoxyphenoxy) benzyl hydantoin (8 parts) was shaken in acetic acid solution in an atmosphere of hydrogen at room temperature using palladised charcoal as a catalyst until the uptake of hydrogen ceased. The acetic acid solution from which the catalyst had been filtered was added dropwise to a stirred solution of sodium nitrite (3 parts) in concentrated sulphuric acid (70 parts) cooled in an ice bath. The mixture was stirred for one hour and poured into ice water containing a little urea. The resulting clear solution was poured immediately into a solution of potassium iodide (20 parts) in water and allowed to stand overnight. The dark coloured tarry solid was removed and boiled with potassium iodide solution to remove excess iodine. The filtered solid after this treatment was dissolved in acetone and purified by treatment with alumina. The acetone was then removed by evaporation and the residue crystallised from acetic acid. (66%) M. P. 212° after melting at 150° and resolidifying. (Found C, 36.7; H, 2.8; N, 5.0; I, 44.9; $C_{17}H_{14}O_4N_2I_2$ requires C, 36.2; H, 2.5; N, 4.95; I, 45.0%.)

EXAMPLE 2

Preparation of 3:5-diiodo-4(4'-methoxyphenoxy) benzyl hydantoin

Two parts 3:5-dinitro-4(4'-methoxyphenoxy) benzyl-hydantoin were reduced catalytically in acetic acid solution and after filtration of the catalyst 10 parts concentrated sulphuric acid were added to the solution. While stirring and cooling 1.4 parts amyl nitrite in glacial acetic acid were added dropwise. After one hour the mixture was poured into potassium iodide solution, when there was a vigorous evolution of gas and a brown precipitate was deposited. The latter was filtered and chromatographed from acetone solution on a column of alumina and the fraction eluted with methyl alcohol, was collected. The solid obtained on dilution with water was crystallized from glacial acetic acid. It was identified as 3:5-diiodo-4(4'-methoxyphenoxy)-benzylhydantoin by M. P. and mixed M. P. 20% yield.

EXAMPLE 3

Preparation of 3:5-diiodo-4-(4'-hydroxyphenoxy)-benzyl hydantoin

The corresponding dinitrohydantoin (2 parts) was reduced with palladised charcoal in acetic acid solution as above. At the end of the reduction the mixture was boiled and the catalyst filtered off. On cooling, the diamino compound crystallised out, M. P. 245°.

The diamino compound prepared above (1 part) suspended in glacial acetic acid was added slowly to a cooled stirred solution of sodium nitrite (7 parts) in concentrated sulphuric acid (18 parts). After having been stirred for one hour the mixture was poured into ice water containing a little urea and the clear solution poured into a solution of potassium iodide (5 parts) in water. The deposited solid was filtered off and crystallised from aqueous acetic acid. (40%) M. P. 258–260°. (Found C, 35.0; H, 2.3; N, 4.9; $C_{16}H_{12}O_4N_2I_2$ requires C, 35.0; H, 2.2; N, 5.1%.)

EXAMPLE 4

Preparation of methyl-3:5-diiodo-4-(4'-methoxyphenoxy) benzoate

Methyl 3:5-dinitro - 4 - (4'-methoxyphenoxy) benzoate (5 parts) suspended in glacial acetic acid (40 parts) was reduced as usual. The filtered solution was evaporated to dryness and the residue crystallised from aqueous acetone; M. P. 162°. The diamino compound (2 parts) was dissolved in glacial acetic acid (20 parts) and the solution slowly added to a cooled stirred solution of sodium nitrite (2.2 parts) in concentrated sulphuric acid (22 parts). The resulting red solution was stirred for half an hour and poured into an aqueous solution of potassium iodide (10 parts). After standing for one hour the mixture was heated to 80° till decomposition was complete. After cooling, the insoluble material was filtered off, dried in vacuo, dissolved in acetone and the solution treated with a little alumina to remove colouring material. The filtered acetone solution was evaporated to dryness and the residue crystallised from aqueous acetone. (40%) M. P. 148–149°.

EXAMPLE 5

Preparation of 3:5-diiodo-4-(4'-methoxyphenoxy) toluene

3:5-dinitro-4-(4'-methoxyphenoxy-toluene (1 part) was reduced in glacial acetic acid solution as usual. The filtered reduction mixture was evaporated to dryness and the residue dissolved in a little ethyl alcohol. Dry hydrogen chloride was passed into the ethyl alcohol solution and ethyl acetate was then added until precipitation of the diamine dihydrochloride was complete. The solid was then filtered off. (90%) M. P. 230°. The above diamine dihydrochloride (9 parts) in glacial acetic acid (200 parts) was added to a cooled stirred solution of sodium nitrite (6 parts) in concentrated sulphuric acid (100 parts). After half an hour the solution was poured into a solution of potassium iodide (70 parts) in water (200 parts). After standing for 24 hours the tarry solid was separated, dissolved in benzene and the benzene solution treated with 5% sodium thiosulphate solution to remove free iodine. The concentrated benzene solution was passed through a column of alumina which absorbed the required iodo compound. This was eluted with 5% methyl alcohol in benzene and the eluate was evaporated to dryness and the residual solid was crystallised from aqueous acetone M. P. 102–104°.

EXAMPLE 6

*Preparation of 3:5-dichloro-4-(4'-methoxyphenoxy)benzyl-hydantoin*

3:5-dinitro-4-(4'-methoxyphenoxy) benzylhydantoin, (2 parts) suspended in acetic acid was shaken in an atmosphere of hydrogen with palladised charcoal until reduction was complete. The filtered solution was added slowly to a cooled stirred solution of sodium nitrite (1.2 parts) in concentrated sulphuric acid (18 parts). After one hour the mixture was poured into an ice cold solution of cuprous chloride, prepared by refluxing copper sulphate (5.4 parts), sodium chloride (2.7 parts) water (23 parts) concentrated hydrochloric acid (85 parts) and copper powder (15 parts). There was a brisk evolution of gas and the solid deposited overnight was collected and recrystallized from acetonitrile/water and ethyl acetate/petrol ether. (47%) M. P. 212–213° C.

EXAMPLE 7

*Preparation of 3:5-dibromo-4-(4'-methoxyphenoxy)benzylhydantoin*

The dinitro compound (2 parts) was reduced and tetrazotised exactly as above and the solution poured into a solution of cuprous bromide (8 parts) in 48% hydrobromic acid. The solid obtained after standing overnight was crystallized from ethyl acetate/petrol as pale buff prisms. (52%) M. P. 220–222° C.

EXAMPLE 8

*L-3:5-diiodo-4(4'-methoxyphenoxy)N-acetyl phenylalanine ethyl ester*

L-3:5-dinitro-4(4'-methoxyphenoxy) N-acetylphenylalanine ethyl ester (15.75 g.) was dissolved in glacial acetic acid (250 ml.) with a little palladised charcoal and hydrogenated at 60–70° and 75 atmospheres pressure. The solution was filtered free of catalyst and dripped into a cooled solution of sodium nitrite (6.5 g.) in concentrated sulphuric acid (250 ml.). After stirring for 30 minutes the resulting orange brown solution was run into 10% $NaI_3$ solution (250 ml.). The black tar which was obtained was filtered off and washed twice with hot sodium iodide solution. The residual dark solid was dried and crystallized from aqueous ethanol, yield 9.5 g.

The recrystallized solid was dissolved in acetone, decolourised by treatment with alumina and recrystallized successively from ethanol and from a mixture of chloroform and petroleum ether, M. P. 138–139°. Found: C, 39.9; H, 3.6; N, 2.3; I, 39.6%. $C_{20}H_{21}O_5NI_2$ requires C, 39.4; H, 3.5; N, 2.3; I, 41.7%. $[\alpha]_D = +40°$.

We claim:

1. As new compounds, the levo form of compounds of the general formula

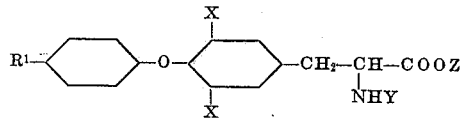

where $R^1$ is lower alkoxy, Z is alkyl containing not more than 4 carbon atoms, Y is selected from the group consisting of acetyl and benzoyl and X is selected from the group consisting of chlorine, bromine and iodine atoms.

2. L-3:5-diiodo-4(4'-methoxyphenoxy)N-acetylphenylalanine ethyl ester.

3. A process for the preparation of 2:6-dihalogenodiphenylethers of the general formula

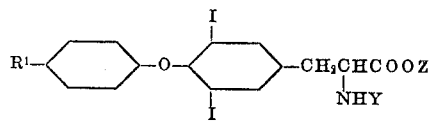

where $R^1$ is an alkoxy group, Y is an acyl group and Z is an alkyl group containing not more than four carbon atoms, which comprises reacting a diaminodiphenylether of the general formula

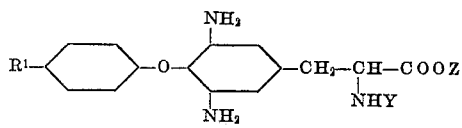

in solution in glacial acetic acid, with concentrated sulphuric acid and sodium nitrite in the absence of water and decomposing the resulting tetrazo compound with water and an alkali metal iodide.

4. A process for the preparation of 2:6-dihalogenodiphenyl ethers of the general formula

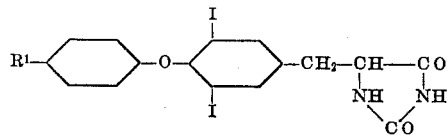

where $R^1$ is an alkoxy group which comprises reacting a diaminodiphenylether of the general formula

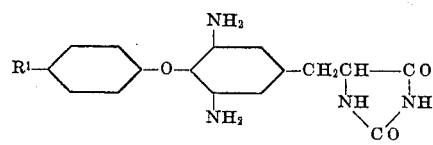

in solution in glacial acetic acid, with concentrated sulphuric acid and sodium nitrite in the absence of water and decomposing the resulting tetrazo compound with water and an alkali metal iodide.

5. The process defined in claim 3 in which the laevo isomer of said diaminodiphenylether is used in the reaction.

6. A process for the preparation of 2:6-dihalogenodiphenylethers of the general formula

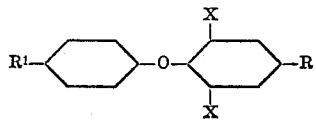

which comprises reacting in the absence of water a diaminodiphenyl ether of the general formula

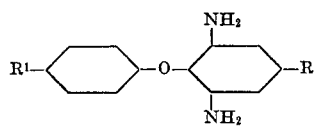

in solution in glacial acetic acid, with concentrated sulphuric acid and a nitrite selected from the group consisting of an alkali metal nitrite and an alkyl nitrite containing less than 6 carbon atoms, and decomposing the resulting tetrazo compound with water and halide selected from the group consisting of alkali metal iodides and cuprous chloride, bromide and iodide, where $R^1$ is a grouping selected from the group consisting of a hydroxyl group, and alkoxy groupings, R is a grouping selected from the group consisting of

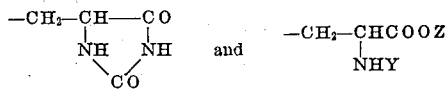

and where Z is an alkyl group containing not more than four carbon atoms, Y is an acyl group and X is selected from the grouping consisting of chlorine, bromine and iodine atoms.

7. The process defined in claim 6 in which said nitrite is sodium nitrite.

EDWARD TEGGIN BORROWS.
JOHN CHARLES CLAYTON.

REFERENCES CITED

The following references are of record in the file of this patent:

Harington et al.: Biochemical Journal, vol. 21, (1927), pp. 169 to 183.